(12) United States Patent
Martin

(10) Patent No.: US 7,743,934 B2
(45) Date of Patent: *Jun. 29, 2010

(54) CONTAINER ASSEMBLY

(76) Inventor: Laura Ann Martin, 185 Varick St., Suite 303, New York, NY (US) 10014

( * ) Notice: Subject to any disclaimer, the term of this patent is extended or adjusted under 35 U.S.C. 154(b) by 989 days.

This patent is subject to a terminal disclaimer.

(21) Appl. No.: 11/103,764

(22) Filed: Apr. 12, 2005

(65) Prior Publication Data

US 2006/0226157 A1    Oct. 12, 2006

(51) Int. Cl.
*B65D 21/024* (2006.01)

(52) U.S. Cl. ............... 220/23.4; 220/630; 206/818; 222/142.9

(58) Field of Classification Search ............ 222/431, 222/448, 142.8, 142.9; 220/630, 628
See application file for complete search history.

(56) References Cited

U.S. PATENT DOCUMENTS

| | | | | |
|---|---|---|---|---|
| 1,216,252 A | * | 2/1917 | Ferguson | 222/142.6 |
| 1,312,434 A | | 8/1919 | Chenery | |
| 1,714,368 A | * | 5/1929 | Hobson | 222/553 |
| 2,004,828 A | * | 6/1935 | Punte | 220/260 |
| 2,514,416 A | * | 7/1950 | Plunkett | 222/142.3 |
| 2,890,816 A | * | 6/1959 | Horland | 222/142.3 |
| 3,020,659 A | | 2/1962 | Paulini | |
| 5,186,350 A | * | 2/1993 | McBride | 220/739 |
| 5,407,107 A | | 4/1995 | Smith | |
| 5,465,871 A | | 11/1995 | Robbins, III | |
| 5,873,486 A | * | 2/1999 | Morgan | 220/739 |
| 2004/0108285 A1 | | 6/2004 | Martin | |

OTHER PUBLICATIONS

PCT Search Report and Written Opinion, Int'l. App. No. PCT/US05/15895 (Jul. 10, 2007).

* cited by examiner

*Primary Examiner*—Stephen Castellano
(74) *Attorney, Agent, or Firm*—Armstrong Teasdale LLP

(57) ABSTRACT

A container assembly includes at least one container and a base. The container includes a hollow body and a lid. The body comprises a sidewall and a bottom, wherein the sidewall circumscribes the bottom. The body sidewall includes a shoulder circumscribing the body. At least a portion of the lid includes a transparent material. The lid is removably coupled to the body such that a cavity is defined by the body and the lid. The lid includes a base portion and a sidewall circumscribing the base portion and extending therefrom. The shoulder is for positioning the lid with respect to the body. At least one of the body and the lid is fabricated from a paper-based material. The container bottom is magnetically coupled to the base.

20 Claims, 3 Drawing Sheets

CONTAINER ASSEMBLY

BACKGROUND OF THE INVENTION

This invention relates generally to container assemblies, and more particularly, to container and rack assemblies fabricated from paper-based materials.

At least some known houses include a pantry area attached to the kitchen for storing goods used in the kitchen including spices. In fact, at least some known kitchen pantries include racks or shelves that are dedicated to storing known spice shakers or known spice containers. However, because of the orientation of the spice container with respect to the racks, removing a spice shaker from the rack may be cumbersome. As a result, frequently used spices may not be stored in the rack, which makes such spices more accessible, but also may undesirably clutter the kitchen.

Known spice containers include a body and a lid that is threadably coupled to the body. Accordingly, the lid must be unscrewed from the container body to discharge the container contents from the container. To expedite the seasoning process, at least some other known spice containers include a shaker top that includes a plurality of openings that permit the container contents to exit the container when the container is inverted. However, as a result of the openings, such lids may also undesirably permit a loss of aroma of the spices when the spices are stored, which over time, may decrease the effectiveness, freshness, and/or potency of the container contents.

BRIEF DESCRIPTION OF THE INVENTION

In one aspect, a container assembly is provided. The container assembly includes at least one container and a base. The container includes a hollow body and a lid. The body comprises a sidewall and a bottom, wherein the sidewall circumscribes the bottom. The body sidewall includes a shoulder circumscribing the body. At least a portion of the lid includes a transparent material. The lid is removably coupled to the body such that a cavity is defined by the body and the lid. The lid includes a base portion and a sidewall circumscribing the base portion and extending therefrom. The shoulder is for positioning the lid with respect to the body. At least one of the body and the lid is fabricated from a paper-based material. The container bottom is magnetically coupled to the base.

In another aspect, a spice rack assembly is provided. The spice rack assembly includes a rack and at least one container magnetically coupled to the rack. The at least one container includes a body and a lid, wherein the body has a sidewall and a bottom. The sidewall circumscribes the bottom, and the lid is coupled to the body such that a cavity is defined by an inner surface of the lid, an inner surface of the sidewall, and an inner surface of the bottom. At least a portion of the lid includes a transparent material. The lid includes a sidewall circumscribing a portion of the body sidewall. The container sidewall includes an opening extending therethrough in flow communication with the cavity. At least one of the body and the lid is fabricated from a paper-based material.

DETAILED DESCRIPTION OF THE INVENTION

Figure 1:
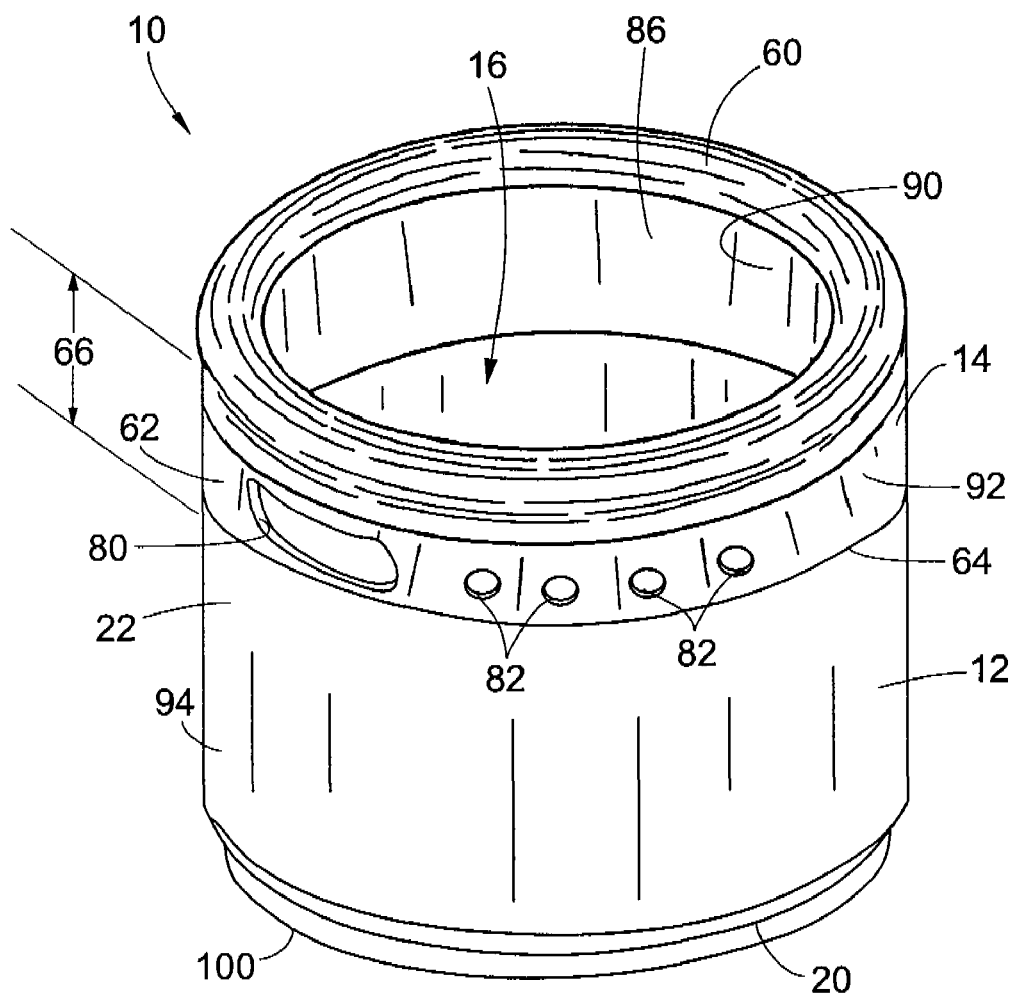
FIG. 1 is perspective view of an assembled exemplary spice container.
Figure 2:
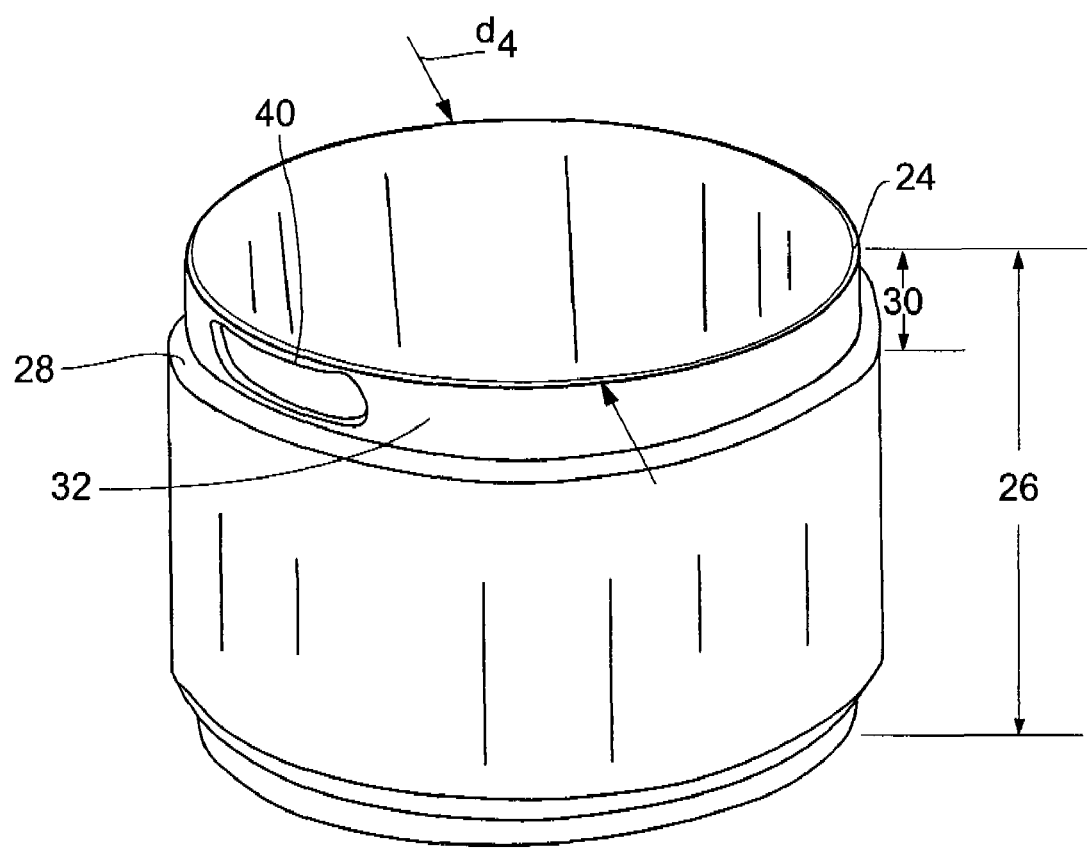
FIG. 2 is a perspective view of a portion of the spice container shown in FIG. 1.
Figure 3:
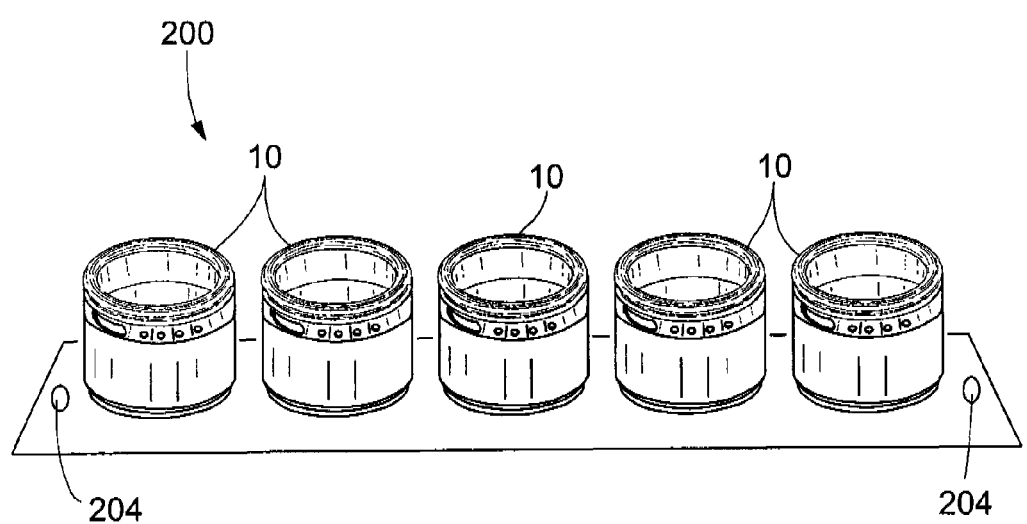
FIG. 3 is a perspective view of an exemplary spice rack including the spice container shown in FIG. 1.

FIG. 1 is a perspective view of an exemplary spice container 10. FIG. 2 is an enlarged view of a portion of spice container 10. Container 10 includes a body portion 12 and a lid 14 that is rotatably coupled to lid 14. Specifically, FIG. 2 is an enlarged view of body portion 12. In the exemplary embodiment, body portion 12 and lid 14 each have a substantially circular cross-sectional profile. In an alternative embodiment, at least one of body portion 12 and/or lid 14 has a substantially non-circular cross-sectional profile. When lid 14 is coupled to body portion 12, a cavity 16 is defined therein.

Body portion 12 has a bottom 20 and a sidewall 22 that circumscribes bottom 20 and extends outwardly therefrom. More specifically, in the exemplary embodiment, sidewall 20 extends substantially perpendicularly from bottom 20 to a rim 24 for a height 26 that is measured between bottom 20 and rim 24. Sidewall 20 is substantially cylindrical and is formed with an annular shoulder 28 that extends circumferentially around body portion 12. In an alternative embodiment, sidewall 20 includes an annular flange that extends circumferentially around body portion 12, and extends outwardly from sidewall 20. Shoulder 28, as described below, positions lid 14 with respect to body portion 12 to facilitate sealing between body portion 12 and lid 14. In an alternative embodiment, lid 14 is formed with an annular shoulder that facilitates positioning lid 14 with respect to body portion 12. More specifically, in the exemplary embodiment, shoulder 28 circumscribes sidewall 22 at a distance 30 from body rim 24, such that a sealing area 32 is defined between rim 24 and shoulder 28.

Sidewall 22 includes a slotted opening 40 that extends through sidewall 22. More specifically, opening 40 extends through sealing area 32 and in the exemplary embodiment, is substantially elliptical. As described below in more detail, opening 40 enables the contents of container 10 to be emptied while lid 14 remains coupled to body portion 12. Alternatively, opening 40 is non-elliptical.

In an alternative embodiment, container 10 includes a ring seal that circumscribes sidewall 22 and is positioned within seal area 32, in contact with flange 26. Accordingly, in such an embodiment, the seal has a width that is approximately equal to, or less than, seal area width 30 and includes at least one opening that is substantially aligned with respect to opening 40. Moreover, in such an embodiment, container 10 may also include a pair of retainers that facilitate maintaining a position of the seal in alignment with respect to sidewall 22.

Lid 14 includes a cap 60 and a sidewall 62 that circumscribes cap 60 and extends therefrom. More specifically, in the exemplary embodiment, sidewall 62 extends substantially perpendicularly from cap 60 to a lower edge or lid seat 64 for a height 66 that is measured between cap 60 and edge 64. In an alternative embodiment, sidewall 62 includes a flange seat (not shown) that extends outwardly from or adjacent to lower edge 64. In such an embodiment, the flange seat cooperates with, and mates against a flange formed within body portion 12 to facilitate enhanced sealing between body portion 12 and lid 14.

In the exemplary embodiment, sidewall 62 includes a slotted opening 80 and a plurality of closely-spaced shaker openings 82. In an alternative embodiment, sidewall 62 may include only opening 80, one or more openings 82, any combination of openings 80 and 82, or may not include openings 80 or 82. More specifically, in the exemplary embodiment, openings 80 and 82 extend through sidewall 62 within sidewall sealing area 32. In the exemplary embodiment, opening 80 is sized substantially identically with opening 40, and openings 82 are each sized identically and are arranged in a row. In alternative embodiments, any or all of openings 82 may be sized differently. An overall size and position of openings 82 and/or opening 80 is variably selected to facilitate discharging the contents of container 10 therethrough. In the exemplary embodiment, shoulder 28 facilitates positioning lid 14 with respect to body portion 12 such that openings 80 or 82 may be registered or substantially aligned with respect to sidewall opening 40 when lid 14 is repositioned with respect to body portion 12.

In the exemplary embodiment, cap 60 includes a transparent window 86 that provides a visual indication of any contents of container 10. In alternative embodiments, cap window 86 extends over substantially all of cap 60. In other alternative embodiments, at least a portion of lid sidewall 62 also includes a transparent window 86.

In the exemplary embodiment, lid 14 has an inner diameter (not shown) measured with respect to an inner surface 90 of cap sidewall 62. The lid inner diameter is slightly larger than an outer diameter $d_4$ of body portion 12, such that when lid 14 is coupled to body portion 12, sealing contact is defined between cap sidewall 62 and body portion 12, and such that lid 14 remains substantially in sealing contact with body portion 12 even when 14 is rotated with respect to body portion 12. Furthermore, when lid 14 is coupled to body portion 12, shoulder 28 facilitates positioning lid 14 with respect to body portion 12. Moreover, in the exemplary embodiment, when lid 14 is coupled to body portion 12, an outer surface 92 of lid sidewall 62 is substantially aligned with an outer surface 94 of body portion sidewall 22. Alternatively, when lid 14 is coupled to body portion 12, lid outer surface 92 is not aligned with respect to sidewall outer surface 94.

In at least one alternative embodiment, container 10 includes a fastening mechanism that enables lid 14 to be rotatably coupled to body portion 12, but restricts removal of lid 14 from body portion 12. For example, in one such embodiment, lid 14 and body portion 12 are interlocked such that when lid 14 is coupled to body portion 12, lid 14 is rotatable with respect to body portion 12, but is not removable without breaching the interlock mechanism. In another alternative embodiment, lid 14 is hingedly coupled to body portion 12 such that rotation of lid 14 with respect to body portion 12 is limited.

A magnet 100 is affixed to body portion 12 for magnetically coupling container 10 to a rack assembly (not shown in FIG. 1). Specifically, magnet 100 is affixed to an outer surface of body portion bottom 20. In the exemplary embodiment, magnet 100 is substantially circular. Alternatively, magnet 100 is non-circular. Magnet 100 has a cross-sectional profile that is smaller than a cross-sectional profile of body portion 20, and accordingly, magnet 100 remains within a signature footprint created between bottom 20 and the rack assembly. In the exemplary embodiment, container bottom 20 is substantially planar. In an alternative embodiment, bottom 20 is non-planar.

In the exemplary embodiment, container 10 is fabricated from a paper-based material, such as but not limited to cardboard materials, high-grade paper materials, or any other paperboard material, including layered, corrugated, fluted, pleated, lined, or coated paper-based materials. In alternative embodiments, only body portion 12 or lid 14 is fabricated from a paper-based material. In the exemplary embodiment, the paper-based material used in fabricating container 10 also facilitates insulating container 10.

During use, container cavity 16 is filled with goods, such as, but not limited to seasonings or spices. Lid 14 is then slidably coupled to body portion 12 such that lid seat 64 is positioned against body shoulder 28. In the exemplary embodiment, because lid seat 64 is contoured to substantially match a contoured radius of shoulder 28, lid seat 68 and shoulder 28 are coupled against each other in a mating relationship and cap sidewall 62 is positioned generally in sealing contact against sealing area 32. More specifically, the tight tolerance and sealing contact between lid 14 and body portion 12 facilitates maintaining the contents of container 10 in a substantially air-tight environment such that a freshness and useful life of the goods is extended.

When a spice, for example, is desired to be discharged from container 10, lid 14 is rotated until either lid opening 80 or any of lid openings 82 are substantially radially aligned with body portion opening 40. After lid 14 is rotated with respect to base portion 12, slightly inverting container 10 enables the contents of cavity 16 to be discharged through either opening 80 or openings 82.

FIG. 2 is a perspective view of an exemplary spice rack 200 including spice container 10. In the exemplary embodiment, spice rack 200 is fabricated from a metallic material to enable container 10 to be magnetically coupled to rack 200. Alternatively, spice rack 200 may be fabricated from a non-metallic material, but may include magnetic materials that enable each container 10 to be magnetically coupled to rack 200. In the exemplary embodiment, rack 200 is substantially planar and includes a pair of mounting openings 204 extending therethrough. Mounting openings 204 enable rack 200 to be mounted in a plurality of orientations.

In the exemplary embodiment, rack 200 is sized and shaped to enable five containers 10 to magnetically couple thereto. However, it should be noted that overall dimensions of spice rack 200 are variably selected depending upon the quantity of spice containers 10 to be coupled thereto. For example, in one embodiment, rack 200 is substantially rectangular-shaped and is sized to magnetically couple a plurality of rows of containers 10.

The above-described container assembly and spice rack is cost-effective and highly reliable. In the exemplary embodiment, at least a portion of the container is fabricated from a paper-based material and is coupled to the container body in such a manner that facilitates sealing contact between the container lid and container body, while still enabling the container lid to be rotatably coupled to the container body. Each container also includes a magnetic base that enables each container to be magnetically coupled to a rack that may be mounted in a plurality of orientations. As a result, an assembly is provided which facilitates storing and dispensing spices in a cost-effective and reliable manner.

Exemplary embodiments of spice racks and container assemblies are described above in detail. The methods are not limited to the specific embodiments described herein, but rather, aspects of each container assembly may be utilized independently and separately from other container assemblies described herein. Each spice rack assembly component can also be used in combination with other spice rack assembly components.

While the invention has been described in terms of various specific embodiments, those skilled in the art will recognize that the invention can be practiced with modification within the spirit and scope of the claims.

What is claimed is:

1. A container assembly comprising:
   at least one container comprising a hollow body and a lid, said body comprising a sidewall and a bottom having a bottommost surface, said body sidewall circumscribing said body, said sidewall circumscribing said bottom, at least a portion of said lid comprising a transparent material, said lid rotatably coupled to said body such that a cavity is defined by said body, said lid comprising a base portion and a sidewall circumscribing said base portion and extending therefrom, said lid sidewall comprising at least a first opening and at least one second opening, said first opening having a larger cross-sectional area than said at least one second opening, said first opening having a different cross-sectional shape than said at least one second opening, at least one of said body and said lid fabricated from a paper-based material;

a magnet extending outward beyond said bottommost surface; and a base, said container bottom magnetically coupled to said base.

2. A container assembly in accordance with claim 1 wherein said at least one container comprises a magnet coupled to an exterior surface of said container body bottom.

3. A container assembly in accordance with claim 1 wherein said container lid comprises at least one opening extending therethrough.

4. A container assembly in accordance with claim 1 wherein said container body sidewall comprises at least one opening extending therethrough.

5. A container assembly in accordance with claim 1 wherein said container lid is slidably coupled to said container body.

6. A container assembly in accordance with claim 1 wherein said container lid sidewall has a height that is less than a height of said body sidewall.

7. A container assembly in accordance with claim 1 wherein said container lid sidewall comprises at least one opening extending therethrough.

8. A container assembly in accordance with claim 7 wherein said container body sidewall comprises at least one opening extending therethrough, a cross-sectional area of said body sidewall opening is larger than a cross-sectional area of said at least one second lid opening.

9. A container assembly in accordance with claim 1 wherein said transparent material is substantially concentrically aligned with respect to said lid.

10. A container assembly in accordance with claim 1 wherein said transparent material is fabricated from a plastic material.

11. A container assembly in accordance with claim 1 wherein said transparent material is recessed with respect to an outer surface of said lid.

12. A container assembly in accordance with claim 1 wherein said transparent material is in sealing contact with an inner surface of said lid when said lid is coupled to said body.

13. A spice rack assembly comprising:

a rack;

a magnet; and at least one container magnetically coupled to said rack, said at least one container comprising a body and a lid, said body comprising a sidewall and a bottom having a bottommost surface, said sidewall circumscribing said bottom, said lid coupled to said body, said lid comprises a sidewall, a first slotted opening and at least one second opening formed in said lid sidewall, said first slotted opening having a different cross-sectional shape than said at least one second opening, at least a portion of said lid comprising a transparent material, said lid sidewall circumscribing a portion of said body sidewall, at least one of said body and said lid fabricated from a paper-based material, said magnet extending outward beyond said bottommost surface.

14. A spice rack assembly in accordance with claim 13 further comprising a magnet affixed to at least one of said rack and said at least one container for magnetically coupling said at least one container to said rack.

15. A spice rack assembly in accordance with claim 13 wherein said container body sidewall comprises an opening extending therethrough in flow communication with said cavity, said lid is rotatable and is positional with respect to said body such that at least one of said container lid openings are substantially concentrically aligned with respect to said container sidewall opening.

16. A spice rack assembly in accordance with claim 15 wherein said container lid is slidably coupled to said container body.

17. A spice rack assembly in accordance with claim 13 further comprising a seal extending between said container lid and said container body.

18. A spice rack assembly in accordance with claim 15 wherein a cross-sectional area of said body sidewall opening is larger than a cross-sectional area of said at least one container lid opening.

19. A spice rack assembly in accordance with claim 13 wherein a magnet has a cross-sectional area that is smaller than a cross-sectional area of said container bottom.

20. A spice rack assembly in accordance with claim 13 wherein said transparent material is substantially concentrically aligned with respect to said lid, and is recessed with respect to an outer surface of said lid.

* * * * *